United States Patent [19]
Sakamaki

[11] Patent Number: 5,615,899
[45] Date of Patent: Apr. 1, 1997

[54] CHUCK APPARATUS

[75] Inventor: Akira Sakamaki, Ojiya, Japan

[73] Assignee: Yukiwa Seiko Kabushiki Kaisha, Niigata-ken, Japan

[21] Appl. No.: 521,572

[22] Filed: Aug. 30, 1995

[30] Foreign Application Priority Data

Aug. 31, 1994 [JP] Japan .................................. 6-207498
May 31, 1995 [JP] Japan .................................. 7-134163

[51] Int. Cl.$^6$ .................................................... B23B 31/12
[52] U.S. Cl. ........................... 279/62; 279/140; 279/902
[58] Field of Search ........................... 279/60–65, 140, 279/902

[56] References Cited

U.S. PATENT DOCUMENTS

| | | | |
|---|---|---|---|
| 3,807,745 | 4/1974 | Bent | 279/62 |
| 4,951,955 | 8/1990 | Sakamaki | 279/60 |
| 5,215,317 | 6/1993 | Jordan et al. | 279/63 |

*Primary Examiner*—Steven C. Bishop
*Attorney, Agent, or Firm*—Sughrue, Mion, Zinn, Macpeak & Seas

[57] ABSTRACT

A chuck apparatus in which an internally provided nut member (2) is rotated by rotating a sleeve (1) so that claws (3) threadedly engaged with the nut member (2) by the rotation of the nut member (2) are advanced/retracted for narrowing/expanding a diameter defined therewith and pressingly fastening/releasing a tool (4). A rotary member (7) is provided to face the nut member (2). A set of an even number of rolling members are provided in a recess portion (7a) formed in the rotary member (7). The rolling members (5) are provided under the condition that the rolling members (5) are in contact with the nut member (2) and a rolling member receiving portion (6) between a predetermined surface of the nut member (2) and the rolling member receiving portion (6) provided to face the predetermined surface of the nut member (2). The predetermined surface is formed into a slant surface (2a); and the rolling members (5) are rollingly rising along the slant surface (2a) by rotating the rotary member (7) to thereby press the nut member (2) forwardly.

8 Claims, 12 Drawing Sheets

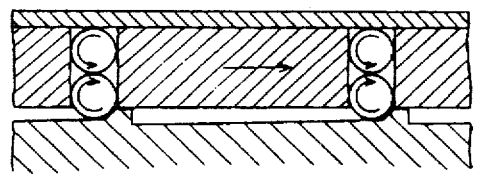
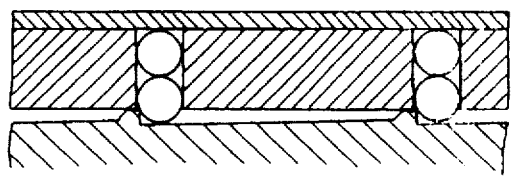
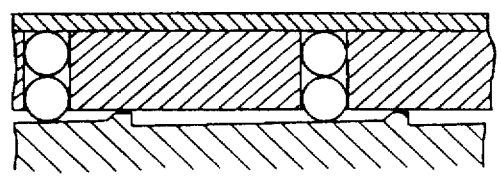
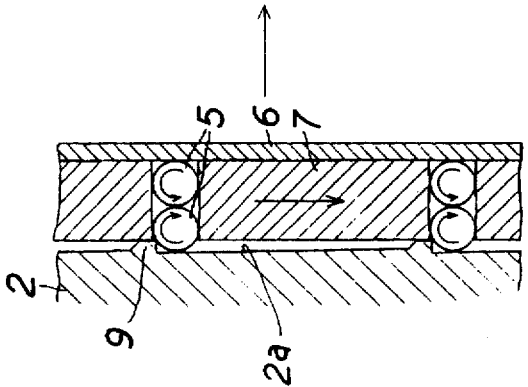

CHUCK APPARATUS

BACKGROUND OF THE INVENTION

1. Field of the Invention

The present invention relates to a chuck apparatus for firmly fastening a tool in place.

2. Description of the Related Art

A conventional chuck apparatus for firmly fastening a tool has been proposed in U.S. Pat. No. 5,215,317 (hereinafter referred to a conventional example).

The conventional example is shown in FIG. 1 in which when a nut member 54 is rotated by rotating a sleeve 51, each claw 52 is advanced so that a diameter defined with the claws 52 is narrowed and the claw 52 is brought into contact with the tool. When the nut member 54 is not rotatable, the sleeve 51 is further rotated, a ring member 55 is rotated to thereby displace a relative position between the ring member 55 and the nut member 54.

As shown in FIG. 2, four recess portions 53 are formed in an annular form in a front end face (that is, in an end face on the side of the nut member 54) of the ring member 55. A slant surface 53a is formed on a bottom surface of each recess portion 53. As best shown in FIG. 3, the slant surface 53a is formed slantwise.

Accordingly, by rotating the sleeve 51 and advancing each claw 52 for narrowing a diameter defined with the claws 52, the claw 52 is brought into contact with the tool, and the nut member 54 is kept unrotatable. When the sleeve 51 is further rotated to rotate the ring member 55, each ball 56 that is in contact with the slant surface 53a is rolled and raised to the right side in FIG. 3, so that the nut member 54 is pushed forwardly by the slant surface 53a to thereby accelerate the fastening of the tool by the claws 52.

As a result of vigorous and continuous studies, the present inventor has found out the following disadvantages in the onventional example.

In the conventional example, until each claw 52 is advanced for narrowing a diameter defined therewith and brought into contact with the tool, the position of each ball 56 that has been located in a gauge 57 is not determined in the slant surface 53a. This is because there is a clearance in an axial direction of the nut member between each ball 56 and the nut member 54 located opposite the ball 56 due to the existence of the slant surface 53a of the recess portion 53. In particular, this clearance is large in the case where the ball 56 is located at the lowest position of the slant surface 53a or in the vicinity thereof (of course, the clearance is at maximum in the case where the ball 56 is located at the lowest position). The ball 56 is kept under the condition that it may be freely moved in the circumferential direction within the recess portion 53 due to the existence of the clearance. Accordingly, there is a condition that the ball 56 is not fixed to any position of the slant surface 53a. The instability of the position of the ball 56 would raise a problem that, in the case where the ball 56 is located at, for example, a position X in FIG. 3, the rolling rising amount of the ball 56 is small so that a sufficient increased fastening could not be attained.

SUMMARY OF THE INVENTION

An object of the invention is to provide a chuck apparatus which may overcome the above-noted defects.

According to the present invention, there is provided a chuck apparatus in which an internally provided nut member 2 is rotated by rotating a sleeve 1 so that claws 3 threadedly engaged with the nut member 2 by the rotation of the nut member 2 are advanced/retracted for narrowing/expanding a diameter defined therewith and pressingly fastening/releasing a tool 4, characterized in that a rotary member 7 is provided to face the nut member 2; a set of an even number of rolling members 5 are provided in a recess portion 7a formed in the rotary member 7; the rolling members 5 are provided under the condition that the rolling members 5 are in contact with the nut member 2 and a rolling member receiving portion 6 between a predetermined surface of the nut member 2 and the rolling member receiving portion 6 provided to face the predetermined surface of the nut member 2; the predetermined surface is formed into a slant surface 2a; and the rolling members 5 are rollingly rising along the slant surface 2a by rotating the rotary member 7 to thereby press the nut member 2 forwardly.

According to another aspect of the invention, there is provided a chuck apparatus in which an internally provided nut member 2 is rotated by rotating a sleeve 1 so that claws 3 threadedly engaged with the nut member 2 by the rotation of the nut member 2 are advanced/retracted for narrowing/expanding a diameter defined therewith and pressingly fastening/releasing a tool 4, characterized in that a rotary member 7 is provided to face the nut member 2; a set of an even number of rolling members 5 are provided in a recess portion 7a formed in the rotary member 7; the rolling members 5 are provided under the condition that the rolling members 5 are in contact with the nut member 2 and a rolling member receiving portion 6 between a predetermined surface of the nut member 2 and the rolling member receiving portion 6 provided to face the predetermined surface of the nut member 2; the predetermined surface is formed into a slant surface 2a; the rolling members 5 are rollingly rising along the slant surface 2a by rotating the rotary member 7 to thereby press the nut member 2 forwardly; and an initial position of the rotary member 7 relative to the nut member 2 is always kept constant when the nut member 2 is not rotatable but the rotary member 7 is further rotated so that a relative position between the nut member 2 and the rotary member 7 is started to be displaced to each other.

The chuck apparatus is further characterized in that in addition to the structure in which the initial position of the rotary member 7 relative to the nut member 2 is always kept constant when the nut member 2 is not rotatable but the rotary member 7 is further rotated so that the relative position between the nut member 2 and the rotary member 7 is started to be displaced to each other, the nut member 2 and the rotary member 7 are spring-biased in opposite rotational directions to each other, and retaining portions 9 are provided for retaining the rolling members 5 at an initial position and a terminal end position of the slant surface 2a.

The chuck apparatus is further characterized by comprising a spring-biased means for biasing the nut member 2 and the rotary member 7 to the opposite rotational directions to each other, which means comprises a coil spring 14, and retaining members 9 for retaining the rolling members 5, which retaining members 9 comprise projections 9'.

According to still another aspect of the invention, there is provided a chuck apparatus in which an internally provided nut member 2 is rotated by rotating a sleeve 1 so that claws 3 threadedly engaged with the nut member 2 by the rotation of the nut member 2 are advanced/retracted for narrowing/expanding a diameter defined therewith and pressingly fastening/releasing a tool 4, characterized in that a rotary member 7 is provided to face the nut member 2; a set of an even nember of rolling members 5 are provided in a recess portion 7a formed in the rotary member 7; the rolling members 5 are provided under the condition that the rolling members 5 are in contact with the nut member 2 and a rolling member receiving portion 6 between a predetermined surface of the nut member 2 and the rolling member receiving portion 6 provided to face the predetermined surface of the nut member 2; the predetermined surface is formed into a slant surface 2a; the rolling members 5 are rollingly rising along the slant surface 2a by rotating the rotary member 7 to thereby press the nut member 2 forwardly; and recess portions 15 are formed in the vicinity of a rising terminal end of the slant surface 2a for retaining the rolling members 5 thereat.

According to still another aspect of the invention, there is provided a chuck apparatus in which an internally provided nut member 2 is rotated by rotating a sleeve 1 so that claws 3 threadedly engaged with the nut member 2 by the rotation of the nut member 2 are advanced/retracted for narrowing/ expanding a diameter therewith and pressingly fastening/ releasing a tool 4, characterized in that a rotary member 7 is provided to face the nut member 2; a set of an even number of rolling members 5 are provided in a recess portion 7a formed in the rotary member 7; the rolling members 5 are provided under the condition that the rolling members 5 are in contact with the nut member 2 and a rolling member receiving portion 6 between a predetermined surface of the nut member 2 and the rolling member receiving portion 6 provided to face the predetermined surface of the nut member 2; the predetermined surface is formed into a slant surface 2a; the rolling members 5 are rollingly rising along the slant surface 2a by rotating the rotary member 7 to thereby press the nut member 2 forwardly; an initial position of the rotary member 7 relative to the nut member 2 is always kept constant when the nut member 2 is not rotatable but the rotary member 7 is further rotated so that a relative position between the nut member 2 and the rotary member 7 is started to be displaced to each other; and recess portions 15 are formed in the vicinity of a rising terminal end of the slant surface 2a for retaining the rolling members 5 thereat.

The chuck apparatus according to this aspect is further characterized in that in addition to the structure in which the initial position of the rotary member 7 relative to the nut member 2 is always kept constant when the nut member 2 is not rotatable but the rotary member 7 is further rotated so that the relative position between the nut member 2 and the rotary member 7 is started to be displaced to each other, the nut member 2 and the rotary member 7 are spring-biased in opposite rotational directions to each other, and retaining portion 9 are provided for retaining the rolling members 5 at an initial position and a terminal end position of the slant surface 2a.

The chuck apparatus according to this aspect is further characterized by comprising a spring-biased means for biasing the nut member 2 and the rotary member 7 to the opposite rotational directions to each other, which means comprises a coil spring 14, and retaining members 9 for retaining the rolling members 5, which retaining members 9 comprise projections 9'.

After the claws 3 have been advanced for narrowing a diameter defined therewith and brought into contact with the tool 4 so that the nut member 2 has been unrotatable, when the rotary member 7 is rotated, the relative position between the rotary member 7 and the nut member 2 is displaced, the rolling members 5 are rollingly raised along the slant surface 2a, and the nut member 2 is pressed forwardly, thereby increasingly fastening the tool 4 by the claws 3.

The rolling members 5 are provided in the recess portions 7a formed in the rotary member 7. Accordingly, the rolling members 5 themselves are moved (rotated) (see FIG. 10B). Since this is not the conventional example in which the member (ring member 55) having the slant surface 2a is moved (rotated) (see FIG. 10A), it is possible to readily set, to a predetermined position, the position (particularly, initial position) of the rolling members 5 relative to the slant surface 2a by rotatively controlling the rotary member 7.

According to some of aspects of the invention, since the recess portions 15 are formed in the vicinity of the rising terminal end of the slant surface 2a, when the rolling members 5 are fitted and retained in the recess portions 15, the rolling members 5 are subjected to a reactive force received from the slant surface 2a. Accordingly, the rotary member 7 is prevented from loosening due to vibrations or the like.

BRIEF DESCRIPTION OF THE DRAWINGS

In the accompanying drawings:

FIGS. 9A to 9D are a series of operational views of the chuck apparatus according to the first embodiment;

DESCRIPTION OF THE PREFERRED EMBODIMENTS

Figure 11:
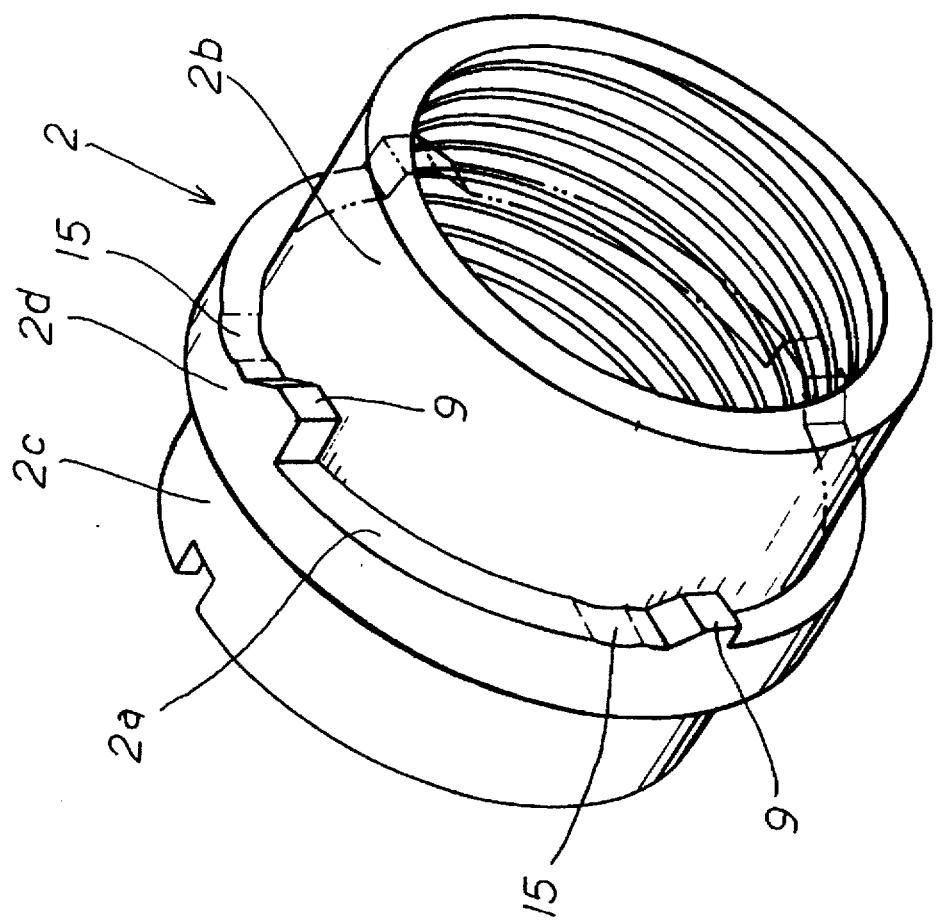
FIG. 11 is a perspective view showing a chuck apparatus according to a second embodiment corresponding to FIG. 7.
Figure 12:
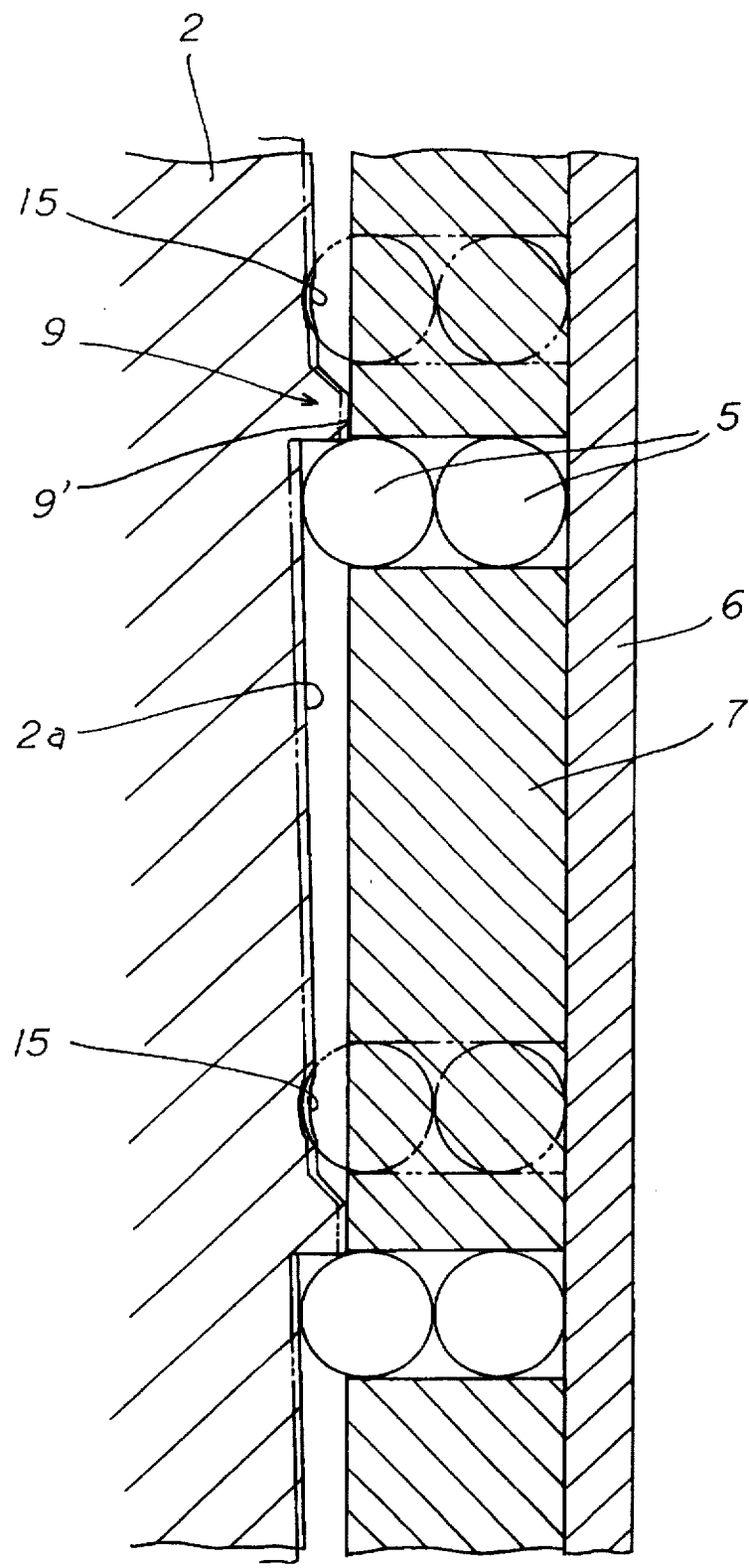
FIG. 12 is a cross-sectional view showing a primary part of the chuck apparatus according to the second embodiment corresponding to FIG. 8.
Figure 13:
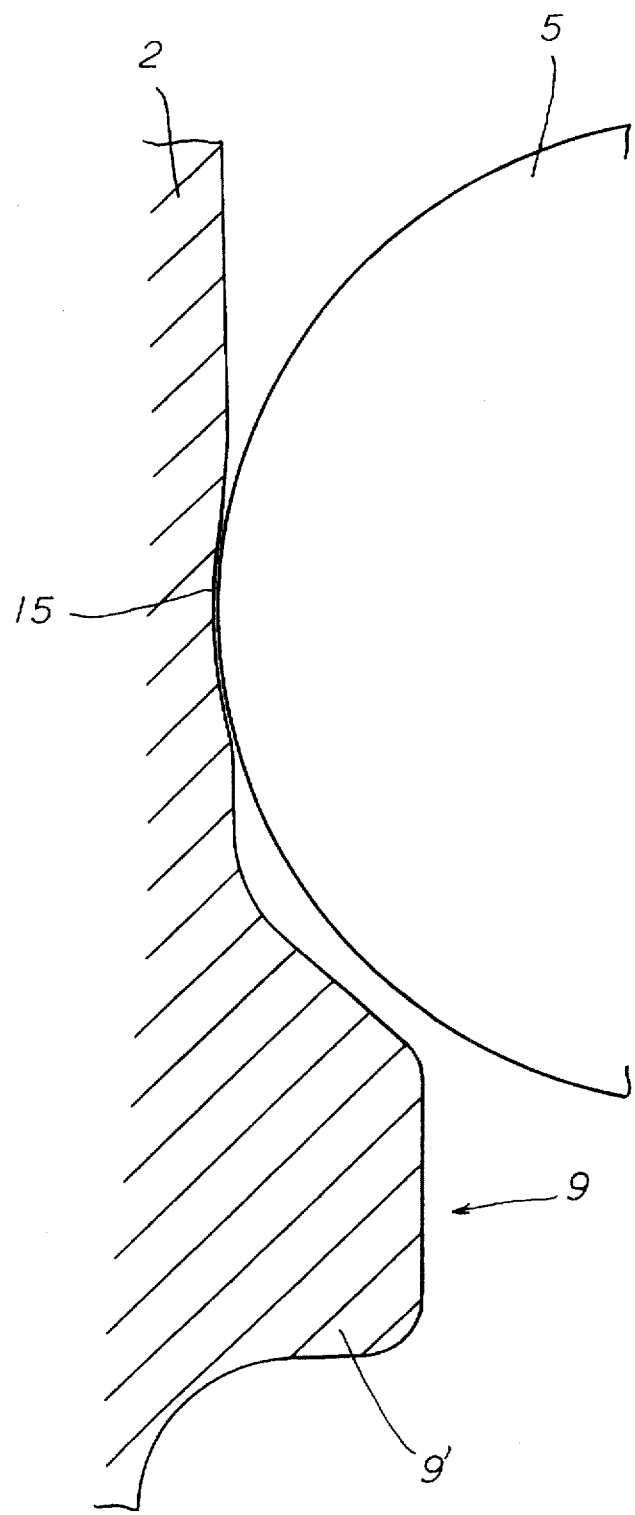
FIG. 13 is an enlarged cross-sectional view showing a recess portion according to the second embodiment.

FIGS. 4 to 9D show a first embodiment of the invention and FIGS. 11 to 13 show a second embodiment of the invention. The present invention will now be described with reference to the accompanying drawings.

Figure 7:
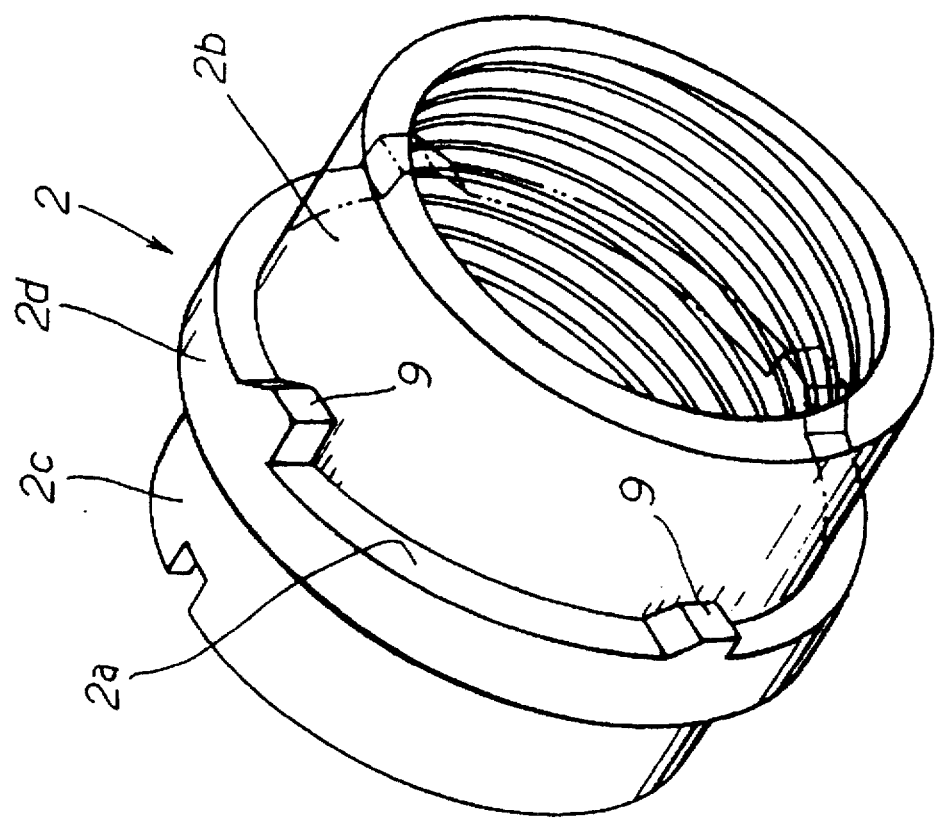
FIG. 7 is a perspective view showing a nut member according to the first embodiment.
Figure 8:
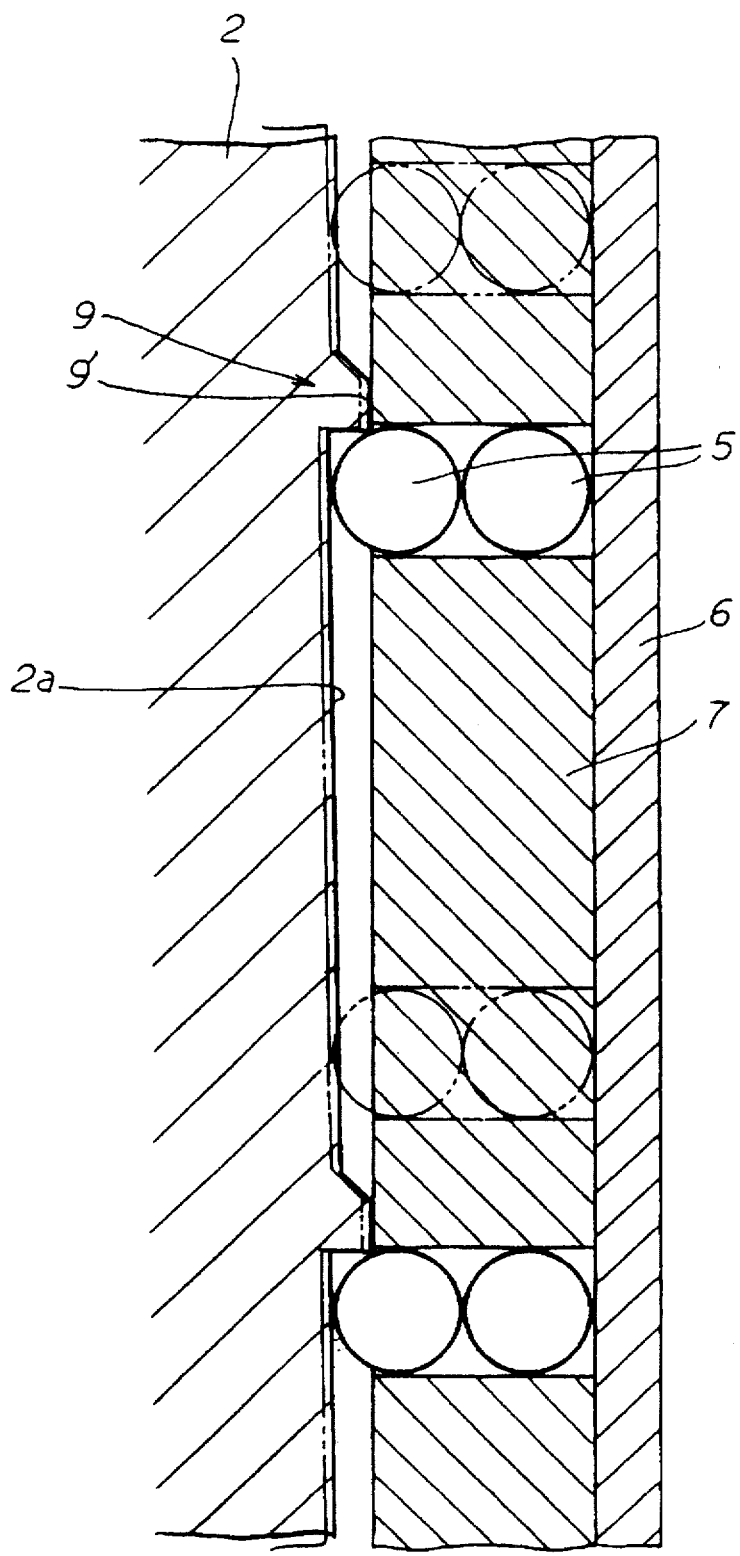
FIG. 8 is a cross-sectional view showing a primary part of the chuck apparatus according to the first embodiment.
Figure 10B:
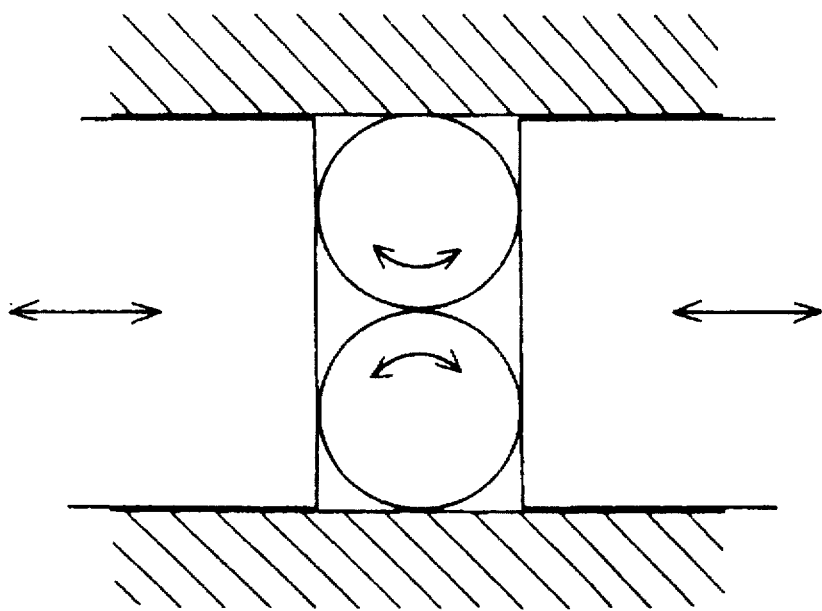
FIGS. 10A and 10B are views of rolling members according to the conventional example and the present invention.
Figure 10A:
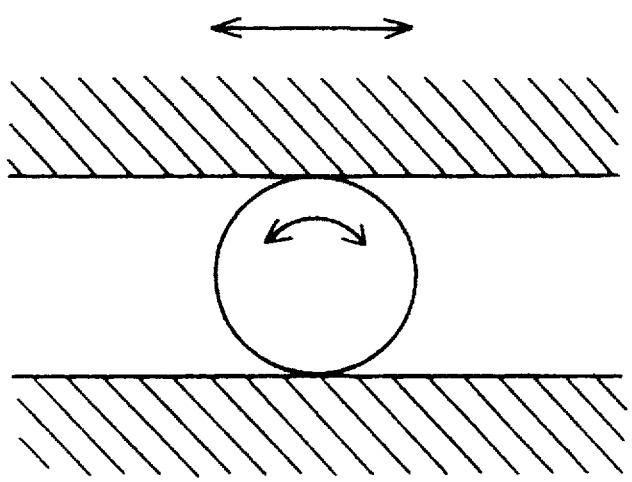

Three claws 3 each having a male screw portion 11 on its outer periphery are inserted into a body 10. A nut member 2 having a female screw portion 12 which is to engage with the male screw portions 11 is fitted to the body 10. A sleeve 1 is fitted to the outer periphery of the body 10. As shown in FIG. 7, the nut member 2 has a rear side portion 2b and a front side portion 2c. Four retaining portions 9 (projections 9') are formed on a surface of the rear side portion 2b of a boundary flange 2d between the rear side portion 2b and the front side portion 2c. A slant surface 2a is formed between adjacent retaining portions 9.

Figure 1:
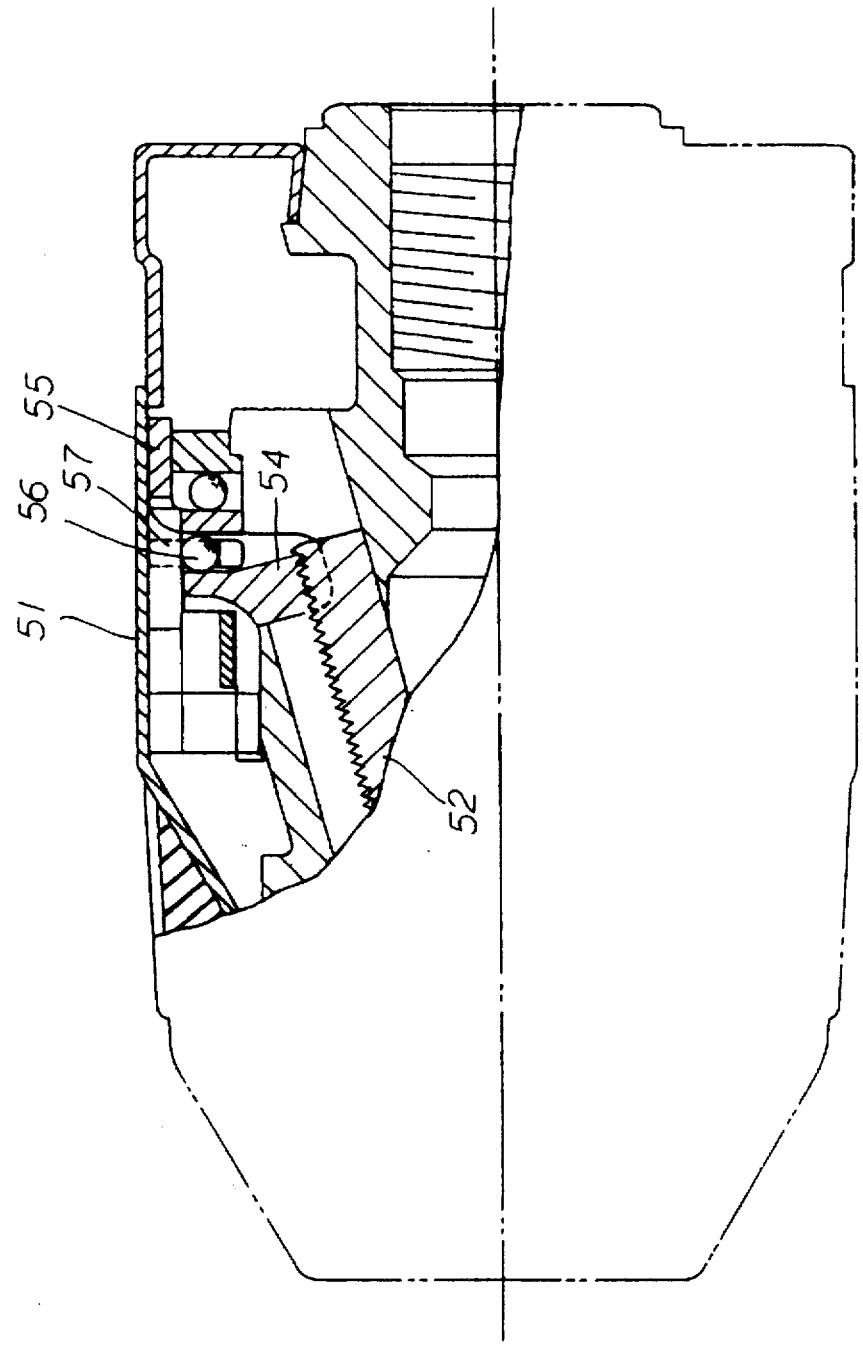
FIG. 1 is an illustration of a fragmentary cross-section showing a conventional example.
Figure 2:
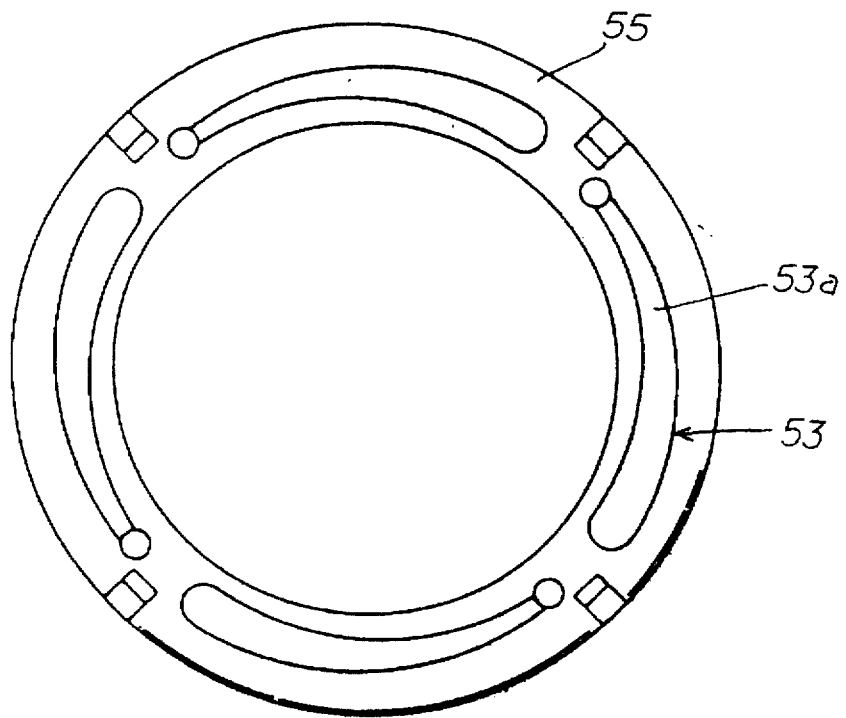
FIG. 2 is a side elevational view showing a ring member of the conventional example.
Figure 3:
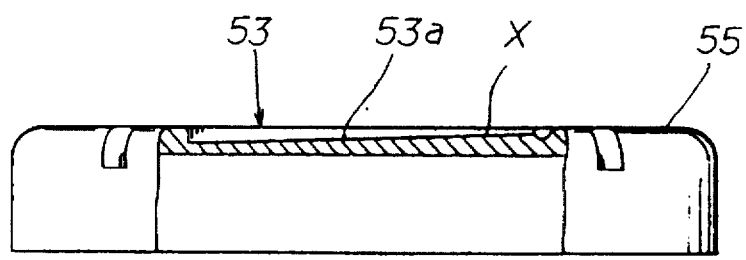
FIG. 3 is a fragmentary frontal view showing a primary part of the ring member of the conventional example.
Figure 4:
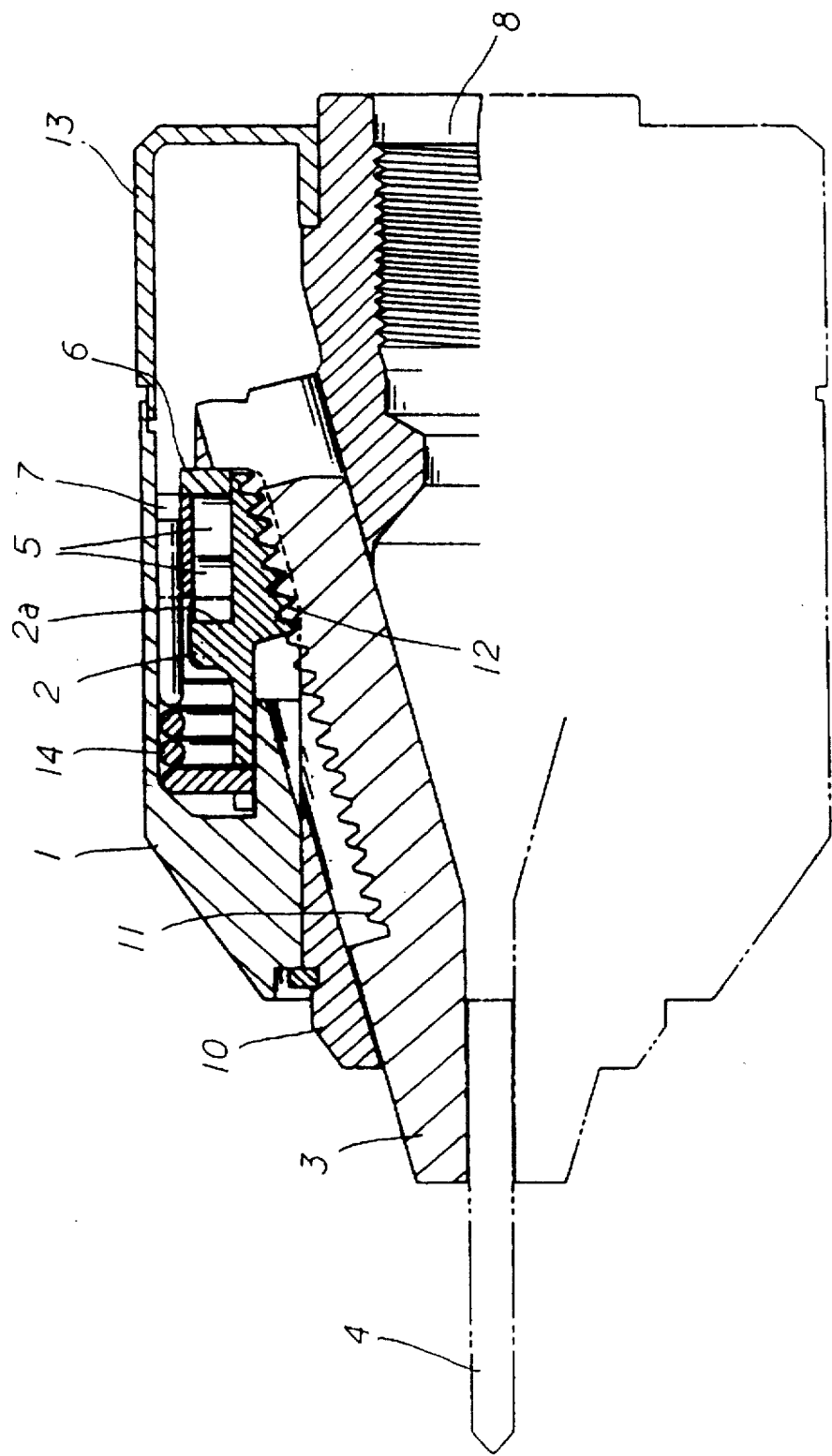
FIG. 4 is a fragmentary cross-sectional view showing a chuck apparatus according to a first embodiment.
Figure 5:
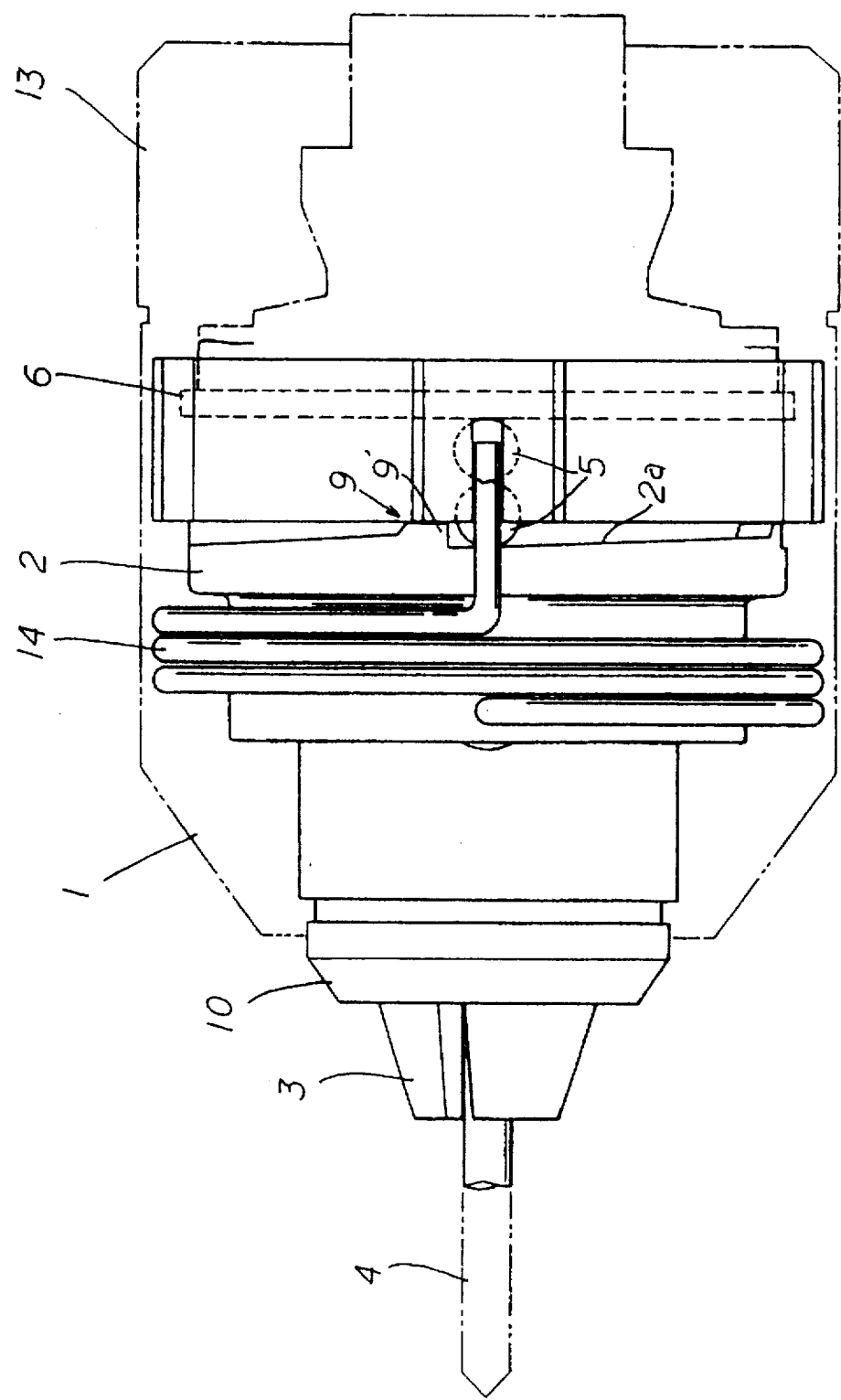
FIG. 5 is an enlarged frontal view showing the chuck apparatus according to the first embodiment.
Figure 6:
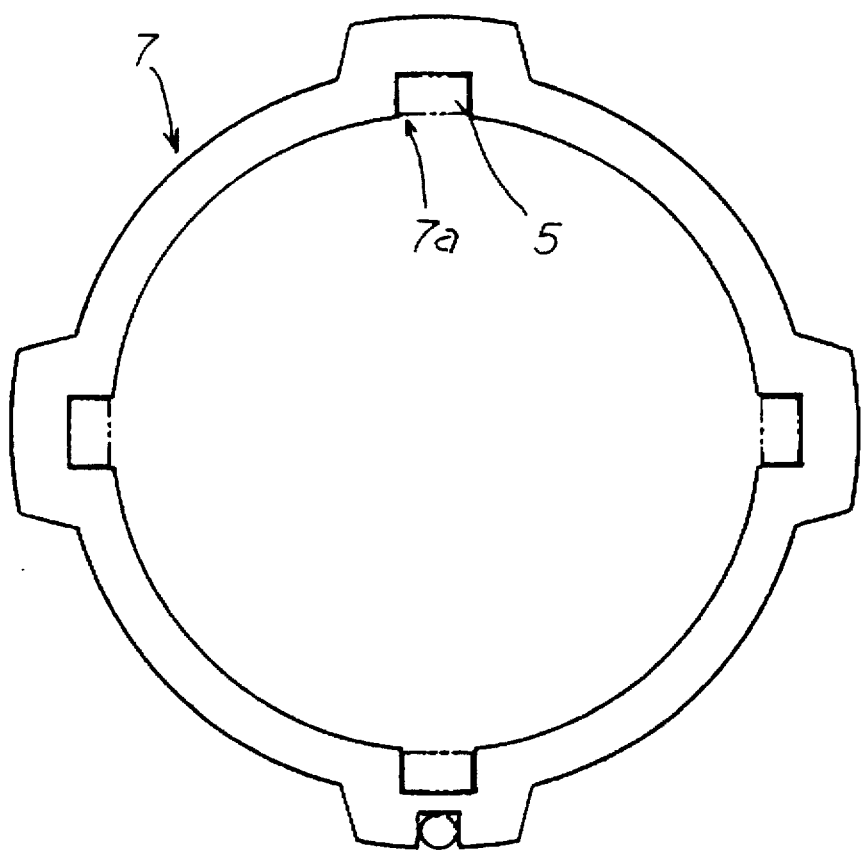
FIG. 6 is a side elevational view showing a rotary member according to the first embodiment.

As shown in FIG. 6, an annular rotary member 7 is fitted to a position of the rear side portion 2b of the nut member 2. The rotary member 7 is fixed to the sleeve 1 by a suitable means (for example, convex/concave fitting coupling means) so that both components are rotatable together. (Incidentally, it is possible to integrally form the rotary member 7 and the sleeve 1.) Accordingly, when the sleeve 1 is rotated, the nut member 2 is also rotated.

Four recess portions 7a are formed at a constant interval in the inner surface of the rotary member 7. A pair of cylindrical rollers are disposed in a recess portion 7a as rolling members 5. One of the rolling members 5 is in contact with the slant surface 2a of the nut member 2 and the other rolling member is in contact with a ring member used as a rolling member receiving portion 6 fitted to a body 10. It is of course possible to integrally form the rolling member receiving portion 6 and the body 10 with each other.

A coil spring 14 is disposed around the nut member 2 with its end being fixedly secured to a hole formed in the nut member 2 and its proximal end being fixedly secured to a hole formed in the rotary member 7.

Reference numeral 8 denotes a female screw hole used when the present apparatus is used in an electric power drill or the like. Numeral 13 denotes a grip sleeve.

The operation of the apparatus thus structured will now be described.

When the sleeve 1 is rotated, the rotary member 7 is rotated. When the rotary member 7 is rotated, the nut member 2 that is connected thereto by the coil spring 14 is also rotated. The claws 3 are advanced for narrowing a diameter defined therewith and brought into contact with the tool 4. The contact makes it impossible to rotate the nut member 2. When the sleeve 1 is further rotated, the rotary member 7 is rotated against the force of the coil spring 14 so that the displacement of the relative position between the nut member 2 and the rotary member 7 is started. Accordingly, one of the rolling members fitted in each recess portion 7a of the rotary member 7 (the left side rolling member in FIG. 8) are rollingly raised along the slant surface 2a of the nut member 2 (in a downward direction in FIG. 8). Thus, the nut member 2 is pressed forwardly so that the tool 4 is increasingly fastened by the claws 3. The two rolling members form one pair to exhibit the maximum rolling frictional effect and to reduce the sliding friction as much as possible. It is therefore possible to provide a very effective apparatus.

In the case where the increasing fastening of the tool 4 is released, when the sleeve 1 is reversely rotated, the rotary member 7 is also reversely rotated. The rolling members are returned back to the initial position by the assistance of the spring force of the coil spring 14 to release the increasing fastening of the tool 4.

The increasing fastening of the tool 4 will be explained in detail with reference to FIGS. 9A to 9D.

FIG. 9A shows an initial position. When the rotary member 7 is rotated from the condition shown in FIG. 9A (that is; the rotation of the rotary member 7 means that the rotary member 7 is moved downwardly in FIG. 9A), the rolling members are rollingly rised along the slant surface 2a to reach the position shown in FIG. 9B which shows the condition that the tool 4 is increasingly fastened.

When the rotary member 7 is reversely rotated from the condition shown in FIG. 9B (For the sake of explanation, the release of the increasing fastening will be explained with reference to FIG. 9B'), the rolling members are rollingly descended along the slant surface 2a to reach the condition shown in FIG. 9C. The condition shown in FIG. 9C is the condition that the increasing fastening has been released.

In the foregoing embodiment, unlike the conventional example in which the balls 56 are only indirectly moved in contact with the slant surface 53a, the rolling members are positively received in the recess portions 7a of the rotary member 7 so that the rolling members themselves are moved, and the rotary member 7 and the nut member 2 are spring-biased by the spring force of the coil spring 14 in the opposite directions while the rotational range of the rotary member 7 is restricted by the projections 9'. Accordingly, in the embodiment, even if a clearance is produced by the slant surface 2a, the initial position of each rolling member (i.e., the relative position to the slant surface 2a) is always kept constant. As a result, the rolling rising amount of the rolling member is always kept constant during the increasing fastening of the tool. Thus, there is no fear of the fault in increasing fastening of the tool as in the conventional example.

Also, in the embodiment, since the projections 9' are formed at both ends of the slant surface 2a, in the case where the increasing fastening of the tool 4 which has been increasingly fastened is to be released, the projections 9' and the rolling members are retained with each other so that the nut member 2 is forcibly rotated (i.e., since the nut member 2 is forcibly rotated while the rolling members are retained by the projections 9' when the rotary member 7 is moved further upwardly in FIG. 9C), the claws 3 may be smoothly retracted for expanding a diameter defined therewith even if the claws 3 would bite the tool 4.

Also, in the case where the claws 3 are under the maximum open condition, there is a fear that the male screw portions 11 of the claws 3 and the female screw portion 12 of the nut member 2 would be stuck to each other. In this case, according to the embodiment, the fault may be overcome. Namely, the maximum open condition of the claws 3 is shown in FIG. 9A. When the sleeve 1 is rotated under this condition and the rotary member 7 is rotated (i.e., the rotary member 7 is moved downwardly in FIG. 9A), if there is no stick, the rotary member 7 and the nut member 2 are rotated together and the rotary member 7 is moved downwardly in FIG. 9A. However, in this case, if there is a stick, the nut member 2 is not moved downwardly and only the rotary member 7 is moved downwardly to reach the condition shown in FIG. 9D through the condition shown in FIG. 9B. The rolling members are retained at the projections 9', and the nut member 2 is forcibly turned downwardly in FIG. 9D to thereby obviate the stick.

A second embodiment of the invention will now be described.

In the second embodiment, a recess portion 15 in which the rolling members 5 are retained are formed in the vicinity of the rising terminal end of the slant surface 2a of the nut member 2 (see FIGS. 11, 12 and 13).

In the second embodiment, when the increasing fastening of the tool 4 is carried out by the rotational motion of the rolling members, since the rolling members are fitted and retained in the recess portion 15 in the vicinity of the rising terminal end of the slant surface 2a, a reactive force from the slant surface 2a is also applied to the rolling members to thereby prevent the loosening of the rolling members 7 caused by vibrations or the like.

The other structure is the same as that of the first embodiment.

As described above, according to the present invention, it is possible to provide a chuck apparatus which is superior in stable fastening of the tool since the initial position of the rolling members is always kept constant with the foregoing structure.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

I claim:

1. A chuck apparatus in which an internally provided nut member (2) is rotated by rotating a sleeve (1) so that claws (3) threadedly engaged with said nut member (2) by the rotation of the nut member (2) are advanced/retracted for narrowing/expanding a diameter defined therewith and pressingly fastening/releasing a tool (4), characterized in that a rotary member (7) is provided to face said nut member (2); a set of an even number of rolling members (5) are provided in a recess portion (7a) formed in said rotary member (7); said rolling members (5) are provided under the condition that said rolling members (5) are in contact with said nut member (2) and a rolling member receiving portion (6) between a predetermined surface of the nut member (2) and the rolling member receiving portion (6) provided to face the predetermined surface of said nut member (2); the predetermined surface is formed into a slant surface (2a); and the rolling members (5) are rollingly rising along the slant surface (2a) by rotating said rotary member (7) to thereby press said nut member (2) forwardly.

2. A chuck apparatus in which an internally provided nut member (2) is rotated by rotating a sleeve (1) so that claws (3) threadedly engaged with said nut member (2) by the rotation of the nut member (2) are advanced/retracted for narrowing/expanding a diameter therewith and pressingly fastening/releasing a tool (4), characterized in that a rotary member (7) is provided to face said nut member (2); a set of an even number of rolling members (5) are provided in a recess portion (7a) formed in said rotary member (7); said rolling members (5) are provided under the condition that said rolling members (5) are in contact with said nut member (2) and a rolling member receiving portion (6) between a predetermined surface of the nut member (2) and the rolling member receiving portion (6) provided to face the predetermined surface of said nut member (2); the predetermined surface is formed into a slant surface (2a); the rolling members (5) are rollingly rising along the slant surface (2a) by rotating said rotary member (7) to thereby press said nut member (2) forwardly; and an initial position of said rotary member (7) relative to said nut member (2) is always kept constant when said nut member (2) is not rotatable but said rotary member (7) is further rotated so that a relative position between said nut member (2) and said rotary member (7) is started to be displaced to each other.

3. The chuck apparatus according to claim (2), further characterized in that in addition to the structure in which the initial position of said rotary member (7) relative to said nut member (2) is always kept constant when said nut member (2) is not rotatable but said rotary member (7) is further rotated so that the relative position between said nut member (2) and said rotary member (7) is started to be displaced to each other, said nut member (2) and said rotary member (7) are spring-biased in opposite rotational directions to each other, and retaining portion (9) are provided for retaining said rolling members (5) at an initial position and a terminal end position of the slant surface (2a).

4. The chuck apparatus according to claim (3), further characterized by comprising a spring-biased means for biasing said nut member (2) and said rotary member (7) to the opposite rotational directions to each other, which means comprises a coil spring (14), and retaining members (9) for retaining said rolling members (5), which retaining members (9) comprise projections (9').

5. A chuck apparatus in which an internally provided nut member (2) is rotated by rotating a sleeve (1) so that claws (3) threadedly engaged with said nut member (2) by the rotation of the nut member (2) are advanced/retracted for narrowing/expanding a diameter defined therewith and pressingly fastening/releasing a tool (4), characterized in that a rotary member (7) is provided to face said nut member (2); a set of an even number of rolling members are provided in a recess portion (7a) formed in said rotary member (7); said rolling members (5) are provided under the condition that said rolling members (5) are in contact with said nut member (2) and a rolling member receiving portion (6) between a predetermined surface of the nut member (2) and the rolling member receiving portion (6) provided to face the predetermined surface of said nut member (2); the predetermined surface is formed into a slant surface (2a); the rolling members (5) are rollingly rising along the slant surface (2a) by rotating said rotary member (7) to thereby press said nut member (2) forwardly; and recess portions (15) are formed in the vicinity of a rising terminal end of the slant surface (2a) for retaining said rolling members (5) thereat.

6. A chuck apparatus in which an internally provided nut member (2) is rotated by rotating a sleeve (1) so that claws (3) threadedly engaged with said nut member (2) by the rotation of the nut member (2) are advanced/retracted for narrowing/expanding a diameter defined therewith and pressingly fastening/releasing a tool (4), characterized in that a rotary member (7) is provided to face said nut member (2); a set of an even number of rolling members are provided in a recess portion (7a) formed in said rotary member (7); said rolling members (5) are provided under the condition that said rolling members (5) are in contact with said nut member (2) and a rolling member receiving portion (6) between a predetermined surface of the nut member (2) and the rolling member receiving portion (6) provided to face the predetermined surface of said nut member (2); the predetermined surface is formed into a slant surface (2a); the rolling members (5) are rollingly rising along the slant surface (2a) by rotating said rotary member (7) to thereby press said nut member (2) forwardly; an initial position of said rotary member (7) relative to said nut member (2) is always kept constant when said nut member (2) is not rotatable but said rotary member (7) is further rotated so that a relative position between said nut member (2) and said rotary member (7) is started to be displaced to each other; and recess portions (15) are formed in the vicinity of a rising terminal end of the slant surface (2a) for retaining said rolling members (5) thereat.

7. The chuck apparatus according to claim 6, further characterized in that in addition to the structure in which the initial position of said rotary member (7) relative to said nut member (2) is always kept constant when said nut member (2) is not rotatable but said rotary member (7) is further rotated so that the relative position between said nut member (2) and said rotary member (7) is started to be displaced to each other, said nut member (2) and said rotary member (7) are spring-biased in opposite rotational directions to each other, and retaining portion (9) are provided for retaining said rolling members (5) at an initial position and a terminal end position of the slant surface (2a).

8. The chuck apparatus according to claim 7, further characterized by comprising a spring-biased means for biasing said nut member (2) and said rotary member (7) to the opposite rotational directions to each other, which means comprises a coil spring (14), and retaining members (9) for retaining said rolling members (5), which retaining members (9) comprise projections (9').

* * * * *

UNITED STATES PATENT AND TRADEMARK OFFICE
CERTIFICATE OF CORRECTION

PATENT NO. : 5,615,899
DATED : April 1, 1997
INVENTOR(S) : Akira Sakamaki It is certified that error appears in the above-identified patent and that said Letters Patent is hereby corrected as shown below:

Claim 3, line 1, delete "(2)" and insert --2--. (Col. 7, line 46)

Claim 4, line 1, delete "(3)" and insert --3--. (Col. 7, line 58)

Signed and Sealed this

Twenty-third Day of September, 1997

Attest:

BRUCE LEHMAN

*Attesting Officer*    *Commissioner of Patents and Trademarks*